Aug. 2, 1966    J. A. KERSAVAGE    3,263,982
BEAM SPRING

Filed June 3, 1964    3 Sheets-Sheet 1

INVENTOR.
Joseph A. Kersavage
BY
Harness and Harris
ATTORNEYS.

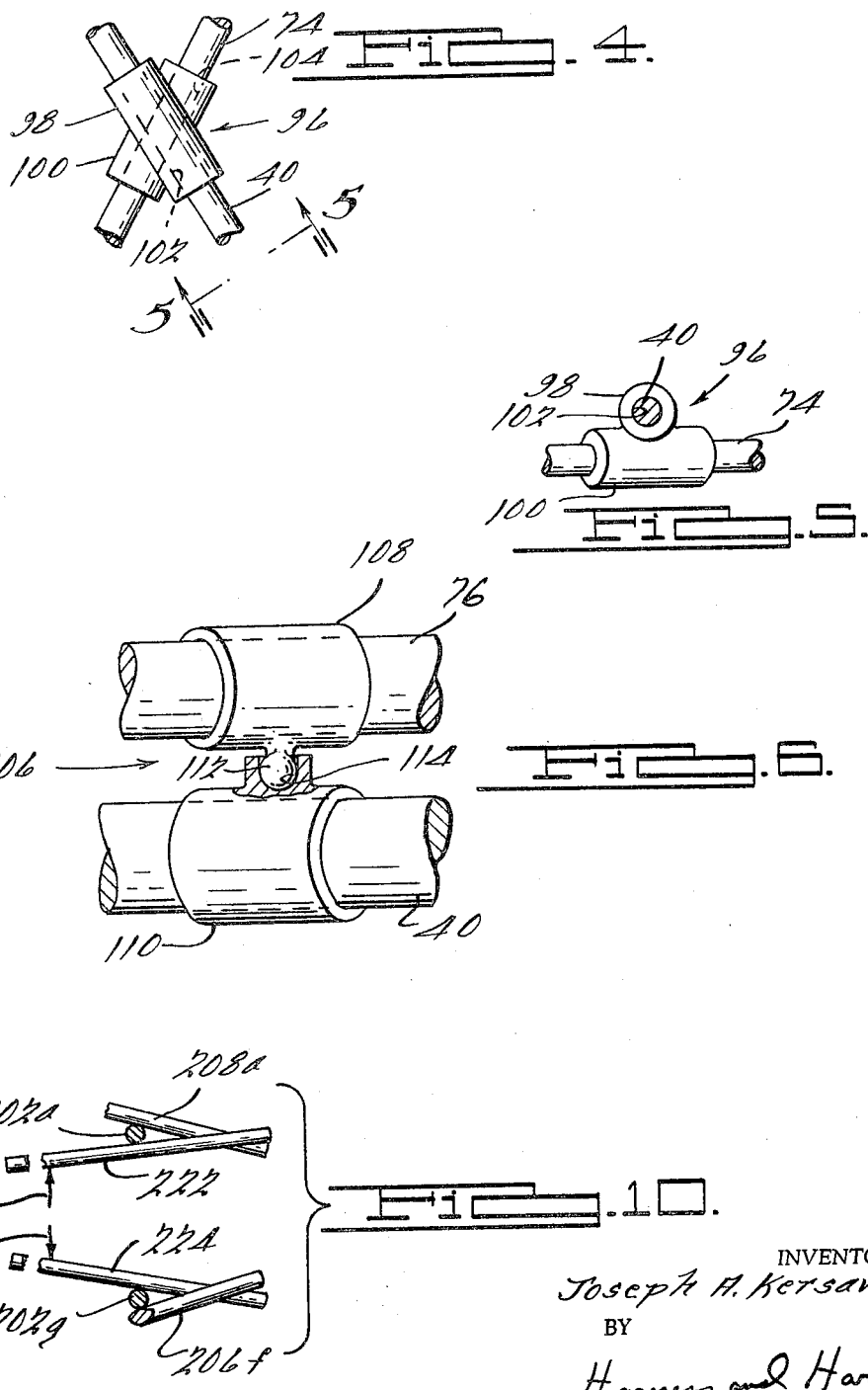

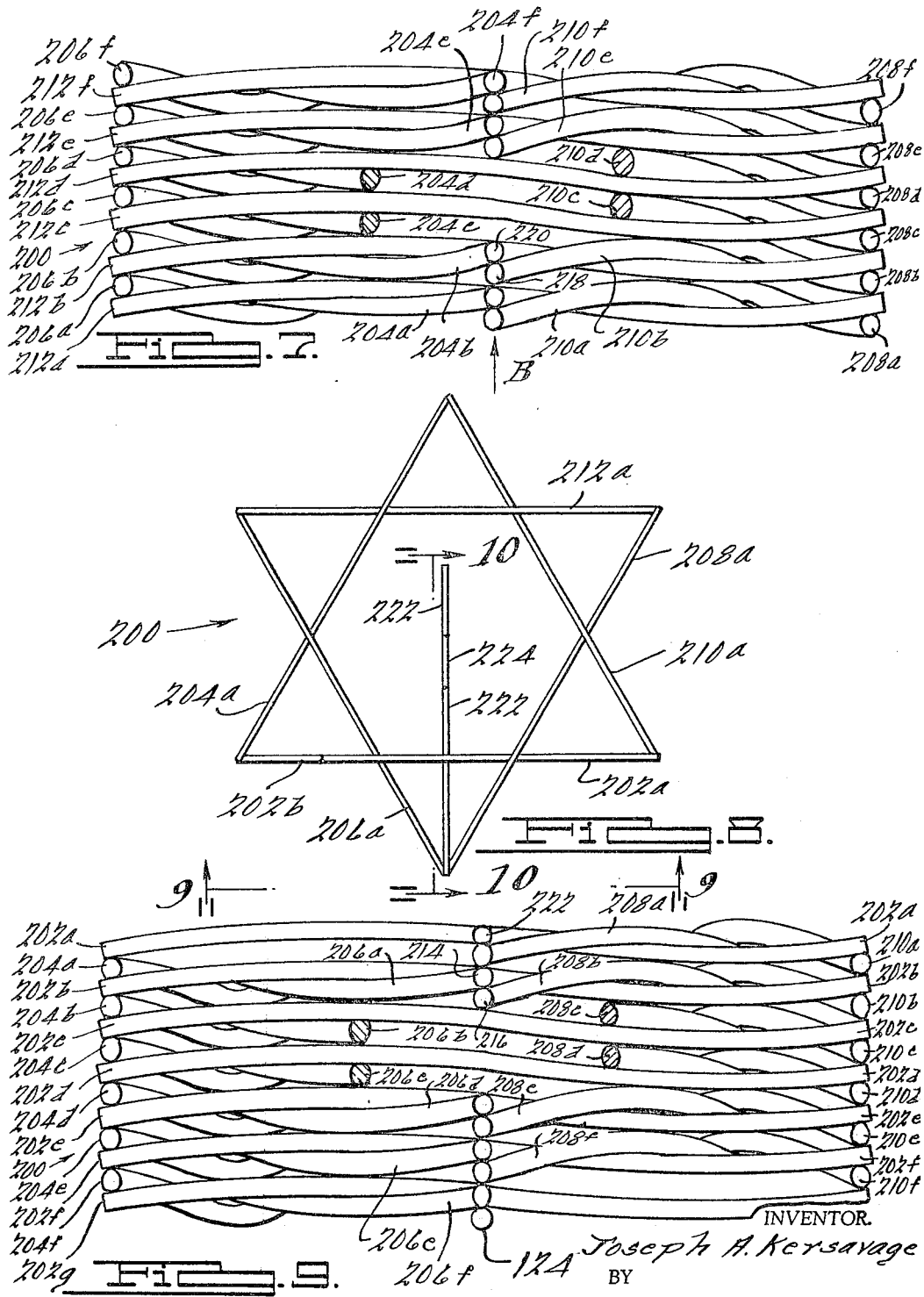

United States Patent Office 3,263,982
Patented August 2, 1966

3,263,982
BEAM SPRING
Joseph A. Kersavage, New Orleans, La., assignor to Chrysler Corporation, Highland Park, Mich., a corporation of Delaware
Filed June 3, 1964, Ser. No. 372,185
17 Claims. (Cl. 267—1)

This invention relates generally to resilient means and more particularly to a spring assembly which is modular in nature and comprised of a plurality of cooperating individual spring members.

Recently it has become necessary to mount relatively large and/or heavy structures and apparatus in a manner which will isolate such structures and apparatus from shock and vibrations. This has been found necessary in such circumstances as, for example, metal cutting machinery located near a thoroughfare upon which are created shocks and vibrations by passing vehicles and the mounting of ballistic missile silos and associated controls and service buildings in order to withstand ground shock.

Presently, relatively large helically coiled compressions springs are employed for such purposes. However, because of practical reasons the size of such coiled springs is limited. Further, even the largest of the coiled springs presently being made has to undergo a coiling operation while in heated condition. The coiling of bars into springs while in such a heated condition often results in slight imperfections as, for example, on the surface of the spring which may ultimately cause failure of the spring after it has been put into service.

Still other disadvantages are associated with coil springs of the prior art. For example, because of the large equipment needed to form the coiled springs of the prior art, such springs must be formed at for example one place and shipped to the place of intended use. The large size of coiled springs results in costly freight charges and also subjects the springs to the possibility of further damage.

Accordingly, an object of this invention is to provide a novel and improved spring structure which can be readily constructed in sizes far exceeding those of the prior art coiled spring.

Another object of this invention is to provide a novel and improved spring structure which can be readily assembled at or relatively near the place of intended use.

Still another object of this invention is to provide a modular spring construction capable of being constructed to have any desired free length.

Other more specific objects and advantages of the invention will become apparent when reference is made to the following description and accompanying drawings wherein:

FIGURES 4, 5 and 6 illustrate mechanical joining devices for connecting cooperating beam members comprising the spring constructed in accordance with this invention;

FIGURES 7, 8 and 9 illustrate another embodiment of the invention with FIGURE 8 being a view taken generally in the direction of arrow B of FIGURE 7 and FIGURE 9 being a view taken substantially on the plane of line 9—9 of FIGURE 8; and FIGURE 10 is a fragmentary cross-sectional view taken generally on the plane of line 10—10 and looking in the direction of the arrows.

Certain details may be omitted from one or more figures for purposes of clarity.

Referring now in greater detail to the drawings, spring 10 of the invention is illustrated as being comprised of a plurality of resilient rods or beams which are connected at their ends to cooperating beams and connected at points intermediate their ends to still other cooperating resilient beams. Although all of the beams or rods may be substantially identical, a different reference number is employed for each beam member for purposes of clarity.

Figure 1:
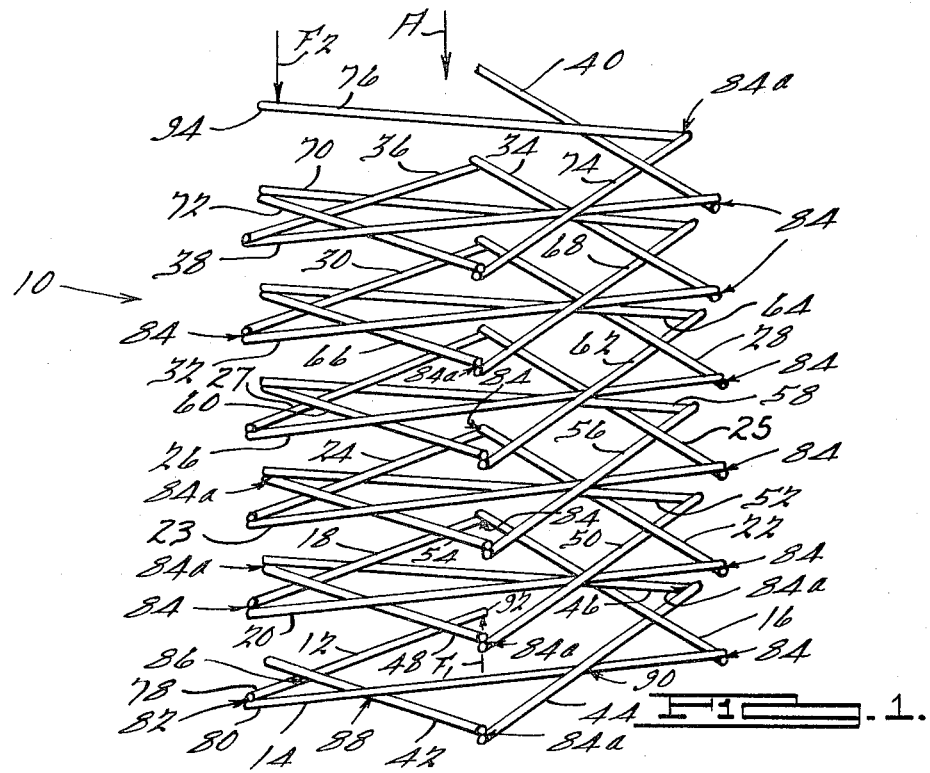
FIGURE 1 illustrates a spring constructed in accordance with the teachings of this invention with the view being taken generally from the side and slightly downwardly on the spring.

Referring to FIGURE 1, it can be seen that generally resilient beams 12 through 40 are serially joined at their ends to form a generally continuous segmentally helical configuration. For example, ends 78 and 80 of beams 12 and 14, respectively, are joined to each other, as by welding, to form a relatively rigid juncture 82. Similarly, cooperating ends of succeeding beams are also joined to provide similar relatively rigid junctures 84 between such beams.

The beams, for example, 12 through 40, are arranged so as to be slightly inclined with respect to a horizontal plane and so as to form, in the plan view, an acute angle with respect to each of the beams joined to the end thereof. For example, with reference to FIGURES 2 and 3, the slight incline from the horizontal can be clearly seen from the position of beam 38, while FIGURE 2 clearly shows the acute angle formed in the top plan view by beams 36 and 38 and beams 38 and 40.

Just as beams 12 through 40 form a first generally helical configuration, beams 42 through 76 can be considered as forming a second generally segmentally helical configuration also having relatively rigid junctures 84a.

As previously stated, not only are each of the beams connected at their ends to cooperating beam members but they are also connected at points intermediate their ends to other cooperating beam members. The beams 12 through 40 are serially joined to each other only at their ends in forming the first generally segmentally helical configuration and likewise beams 42 through 76 are serially joined to each other only at their ends in forming the second generally segmentally helical configuration. However, beams from the group generally referred to as 12 through 40 are respectively joined to beams from the group designated 42 through 76 at points which are intermediate the ends of both such cooperating beams.

For example, referring to FIGURE 1, beam 42 overlays beam 12 forming a juncture 86 and underlays beam 14 to form a juncture 88 therewith. Beam 14 forms yet another juncture 90 with the overlaying beam 44. Such junctures as 86, 88 and 90 may be made relatively rigid, as the junctures 82 and 84, as by welding. The overlaying of respective beam members continues to any extent desired forming junctures as 88 and 90 until the desired free length of spring is achieved.

Referring to FIGURE 1, it should be noted that, because of the generally overlapping relationship of the cooperating beam members, that if an upwardly directed force $F_1$ is applied at end 92 of beam 12 and a downwardly directed force $F_2$ is applied at end 94 of beam 76 that each of the beams comprising spring 10 undergo, almost exclusively, simple bending and shear stresses.

Among other important benefits of the invention, the spring configuration disclosed permits the "on-site" construction of the required spring. That is, the material for the spring can be easily transported in the form of simple beams which later are joined to form a spring of the configuration described. Further, since no coiling of the spring material is required, it should be apparent that beams of relatively immense cross-section could be employed if such was structurally required.

Figure 2:
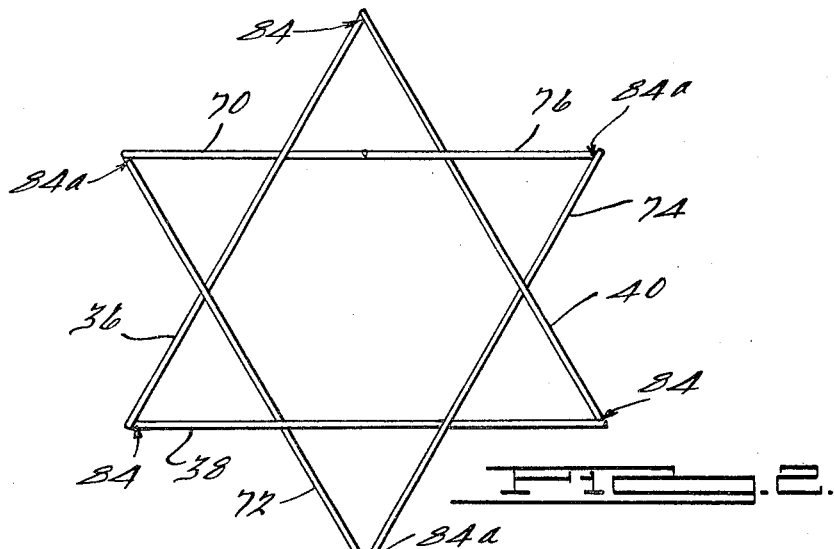
FIGURE 2 is a top plan view of the spring configuration of FIGURE 1 taken generally in the direction of arrow A of FIGURE 1.
Figure 3:
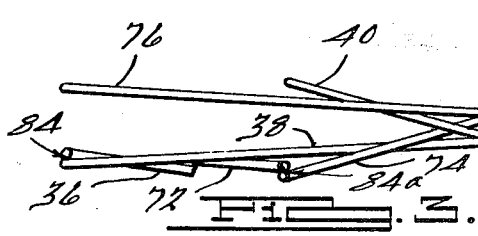
FIGURE 3 is a fragmentary side elevational view of the spring configuration of FIGURES 1 and 2, taken generally in the direction of arrow B of FIGURE 2.

The configuration of FIGURES 1, 2 and 3 has been described as having junctures which may be made relatively rigid as by welding. Such junctures, as previously stated result in the spring 10 exhibiting very little torsion in its individual beam members during normal usage. However, it should be noted that another important advantage of the invention is that several beam members do not have to be held to each other by either any metallurgical joining process or any mechanical joining devices.

That is, because of the novel arrangement of the respective beam members any compressive forces experienced by the spring 10 causes the beam members to be retained in the pattern disclosed. This is believed to be partly attributable to the friction existing at the points of juncture or overlaying and the bending of one beam member over another cooperating beam member thereby retaining each other in the disclosed relationship. In such cases where there is no rigid juncture formed, the spring 10 will not experience any perceptible torsion during normal usage but rather, for all practical purposes, merely forces of simple shear and bending.

In some instances it might be desirable to provide mechanical devices for joining the spring members to each other. FIGURES 4, 5 and 6 illustrate but two such devices which can be employed for this purpose without causing the respective beam members to experience even the slight amount of torsion as would be present in a similar spring configuration wherein the beam members had their junctures welded.

Referring to FIGURES 4 and 5, a journal device 96 is illustrated as comprising integrally formed journal portions 98 and 100 which are arranged so as to have their respective bearing surfaces 102 and 104 skew to each other. In the illustration of FIGURES 4 and 5, the journal device 96 is shown as having spring beam members 74 and 40 passing therethrough, each of the beam members is, of course, able to rotate and slide axially within the cooperating bearing surface.

FIGURE 6 illustrates another mechanical joining device 106 which is comprised of one sleeve member 108 secured as to beam member 76 and another sleeve member 110 secured to beam member 40. Sleeve 106 has fixed thereto or formed integrally therewith a ball 112 which is received within a spherical-like recess 114 which is carried by sleeve 110.

It should be understood that even though each of the mechanical joining devices 96 and 106 have been illustrated with reference to the intersection of beam members 40 and 74, that such devices 96 and 106 can be employed at every intersection or juncture comprising spring 10 and that they can also be used at ends of each of the spring beam members.

FIGURES 1, 2 and 3 specifically illustrated a compression type of spring configuration constructed in accordance with the teachings of this invention. FIGURES 7, 8, 9 and 10, however, disclose a tension spring which, also, is constructed in accordance with the teachings of this invention.

In order for a better understanding of the tension spring 200, it is best to keep in mind the relationships of FIGURES 7, 8 and 9. That is, FIGURE 8 is a view taken of FIGURE 7 in the direction of arrow B in FIGURE 7 while FIGURE 9 is a view taken generally on the plane of line 9—9 of FIGURE 8. It should also be mentioned that in comparison, FIGURES 7 and 9 are of the same scale while FIGURE 8 is of a reduced scale.

The tension spring 200 of FIGURES 7, 8 and 9 is somewhat similar to the spring 10 of FIGURES 1, 2 and 3 in that it also is comprised of a plurality of relatively resilient rods or beams which are connected at their ends to cooperating beams and also connected at points intermediate their respective ends to still other cooperating resilient beams.

For purposes of clarity all of the beam members (which may be of substantially identical configuration) that can be considered as lying in a single plane perpendicular to the plane of FIGURE 8, are identified with a single reference number. However, each of such members within that group will be further differentiated from other beams of that group by a letter suffix.

Further, any reference to one member being "over," "under" or "overlaying" another member is made with regard to the positions such members would assume if FIGURE 8 represented the top plan view of the spring 200. For example, with reference to FIGURE 7, the end of member 212a will be regarded as "overlaying" the end of member 206a even though in FIGURE 7 the end of member 212a appears, because of the drawing requirements, to be under the end of beam 206a.

The ends of beam members 204c, 204d, 210c and 210d of FIGURE 7 and the ends of 206b, 206c, 208c and 208d of FIGURE 9 are broken away in order to more clearly illustrate the typical configuration of the beam members. As best shown by beam members 212c and 212d of FIGURE 7 and 202c and 202d of FIGURE 9, the beam members are formed so as to assume a generally S shaped configuration in at least one plane.

The general arrangement of the beam members is as follows. For example, in FIGURE 9 it can be seen that one end of beam 204a is overlying an end of beam 202b which crosses over beam 206a, intermediate its ends, causing beam 206a to be urged downwardly. Such downward urging of beam 206a in turn causes its end 214 to urge end 216 of beam 208b downwardly. Beam 208b, however, crosses and overlays beam 202b intermediate its ends consequently causing, in cooperation with beam 204a, beam 202b to be bent generally downwardly about beam 206a. Such downward bending tendency by beam 208b is, however, restricted by the end of beam 210b which tends to urge the cooperating end of beam 202b upwardly. Also as seen in FIGURE 9, beam 210b overlays and crosses over beam member 208b at a point intermediate the ends of each. Further, referring to FIGURE 7, it can be seen that beam 210b, while crossing over beam 208b, crosses under beam 212b and terminates by having its end 218 overlaying end 220 of beam 204b which, in turn, crosses and overlays beam 212b and the other end of beam 204b overlays the end of beam 202c as shown in FIGURE 9. However, as also illustrated in FIGURE 7, beam 206b crosses over beam 204b and, since 206b is urged downwardly by 212b, thereby causes said other end of beam 204b to urge the cooperating end of beam 202c downwardly as shown in FIGURE 9.

It should be observed that if the connecting beams are followed that, assuming beam 202a to be the uppermost or top terminal member and beam 202g to be the lowermost or bottom terminal member, a generally left-hand or counter-clockwise spiral pattern is developed and that the lead or pitch or such spiral is negative in that it progresses downwardly.

Spring 200 is also like spring 10 of FIGURES 1, 2 and 3 in that no additional means are required for retaining beam members together. This, of course, does not preclude the possibility that either welding of beam junctures or the provision of some other mechanical joining devices as, for example, illustrated by FIGURES 4, 5 and 6, may be employed in constructing the spring 200.

It should be noted that as spring 200 is expanded, by appropriately applied forces, that each of the beam members is undergoing resilient deflection in a direction which causes each of the beam members to want to return to a position as that illustrated by FIGURES 7 and 9.

In order to have central loading, inwardly directed beam members 222 and 224 may be provided at each end of the spring. Referring to FIGURES 8, 9 and 10, it can be seen that the beam member 222 extends inwardly of the spring 200, passing under terminal member 202a, and having an end overlaying the end of beam 208a. Similarly, beam 224 crosses over lower terminal beam member 202g and under the end of beam 206f. If forces $F_3$ and $F_4$ are applied generally as indicated in FIGURE 6 so that their effective lines of action are generally centrally disposed when viewed in FIGURE 8, completely central loading of the tension spring 200 in achieved.

Although not specifically illustrated in FIGURES 1, 2 and 3, it should be apparent in view of FIGURES 7 through 10 that loading beam members similar to 222 and 224 can be employed to achieve central compressive loading of spring 10. For example, referring to FIGURE 1, the uppermost could be placed so as to be directed inwardly and cross over beam 76 and under beam 40 while a lowermost beam could pass under beam 12 and cross over beam 42.

Both springs 10 and 200 are of course capable of modifications. For example, since each of the springs is modular, for any given pitch of the spring and it is possible to vary the lengths of beam members so as to achieve any desired number of beam members. As the number of beam members per pitch of the spring increases the overlapping beam members tend to approach a generally circular configuration when viewed generally in the direction of the axis of such a spring.

Other variations and modifications are of course possible without departing from the spirit of this invention. For example, the S-shaped beam members of FIGURES 7, 8 and 9 may be preformed to the required shape or may in fact be resiliently deformed during assembly into the required shape. Further, the spring beam members of both springs 10 and 200 need not be of uniform cross-section since it is conceivable that in some circumstances variations in cross-sectional configuration as well as cross-sectional areas may be desired in order to achieve variations in spring rate.

Although only two principal embodiments of the invention have been disclosed and described it is apparent that other embodiments and modifications of the invention are possible within the scope of the appended claims.

I claim:

1. A spring assembly comprising a first plurality of first relatively straight spring beam members being serially joined in overlapping end-to-end relationship, a second plurality of second relatively straight spring beam members being serially joined in overlapping end-to-end relationship, said first plurality of first relatively straight spring beam members collectively forming a first generally segmental spiral with each of said first beam members forming a segment of said first spiral, and said second plurality of second relatively straight spring beam members collectively forming a second generally segmental spiral with each of said second beam members forming a segment of said second spiral, said first and second spirals being arranged with respect to each other so as to cause each of said first beam members to be intersected at a point intermediate the ends thereof and in overlapping fashion by at least one of said second beam members.

2. A spring assembly comprising a first plurality of first substantially straight spring beam members of substantially uniform cross-section being serially joined by welding in overlapping end-to-end relationship, a second plurality of second substantially straight spring beam members of substantially uniform cross-section being serially joined by welding in overlapping end-to-end relationship, said first plurality of first spring beam members collectively forming a first generally segmental spiral with each of said first beam members forming a segment of said first spiral, and said second plurality of second spring beam members collectively forming a second generally segmental spiral with each of said second beam members forming a segment of said second spiral, said first and second spirals being arranged with respect to each other so as to cause each of said first beam members to be intersected at a point intermediate the ends thereof and in overlapping fashion by at least one of said second beam members.

3. A spring assembly comprising a first plurality of first substantially straight spring beam members of substantially uniform cross-section being serially joined by welding in overlapping end-to-end relationship, a second plurality of second substantially straight spring beam members of substantially uniform cross-section being serially joined by welding in overlapping end-to-end relationship, said first plurality of first spring beam members collectively forming a first generally segmental spiral with each of said first beam members forming a segment of said first spiral, and said second plurality of second spring beam members collectively forming a second generally segmental spiral with each of said second beam members forming a segment of said second spiral, said first and second spirals being arranged with respect to each other so as to cause each of said first beam members to be intersected at a point, intermediate the ends thereof and in overlapping fashion by at least one of said second beam members, said points of overlapping intersection between said first and second beam members being welded so as to form relatively rigid junctures.

4. A spring assembly comprising a first substantially straight spring member, a second substantially straight spring member overlapping said first spring member and forming a relatively rigid first juncture therebetween, said first juncture being formed at a point on said first spring member which is spaced from one end of said first spring member a distance equal to approximately a third of the length of said first spring member, said first juncture also being formed at a point on said second spring member which is spaced from one end of said second spring member a distance equal to approximately a third of the length of said second spring member, a third substantially straight spring member having one end thereof joined to and beneath said one end of said first spring member forming a relatively rigid second juncture therebetween, said third spring member overlapping said second spring member and forming a relatively rigid third juncture therebetween, said third juncture being formed at a point on said second spring member which is substantially midway between said first juncture and the other end of said second spring member, said third juncture being formed at a point on said third spring member which is spaced from said one end of said third spring member a distance equal to approximately a third of the length of said third spring member, a fourth substantially straight spring member having one end joined to the other end of said second spring member and being disposed beneath said second member other end forming a fourth relatively rigid juncture therebetween, said fourth spring member overlapping said third spring member and forming a relatively rigid fifth juncture therebetween, said fifth juncture being formed at a point on said third spring member which is substantially midway between said third juncture and the other end of said third spring member, said fifth juncture also being formed on said fourth spring member at a point which is spaced from one end of said fourth member a distance which is equal to approximately a third of the length of said fourth spring member, a fifth substantially straight spring member having one end joined beneath the other end of said third spring member so as to form beneath the other end of said third spring member so as to form a relatively rigid sixth juncture therebetween, said fifth spring member overlapping said fourth spring member and forming a relatively rigid seventh juncture therebetween, said seventh juncture being formed at a point on said fourth spring member which is substantially midway between said fifth juncture and the other end of said fourth spring member, said seventh juncture being formed at a point on said fifth spring member which is spaced from said one end of said fifth spring member a distance equal to approximately a third of the length of said fifth spring member, a sixth spring member having one end joined to and beneath the other end of said fourth spring member forming a relatively rigid eighth juncture therebetween, said sixth spring member overlapping said fifth spring member and forming a relatively rigid ninth juncture therebetween, said ninth juncture being formed at the point on said fifth spring member which is substantially midway between said seventh juncture and the other end of said fifth spring member, and said ninth juncture being formed on said sixth spring member at a point which is spaced from said one end of said sixth spring member a distance equal to approximately a third of the length of said sixth spring member.

5. A spring assembly comprising a first substantially straight spring member, a second substantially straight spring member overlapping said first spring member and forming a first juncture therebetween, said first juncture being formed at a point on said first spring member which is intermediate the ends thereof, said first juncture also being formed at a point on said second spring member intermediate the ends thereof, a third substantially straight spring member having one end thereof joined to and beneath one end of said first spring member forming a second juncture therebetween, said third spring member overlapping said second spring member and forming a third juncture therebetween, said third juncture being formed at a point on said second spring member intermediate said first juncture and an end of said second spring member, said third juncture being formed at a point on said third spring member which is intermediate the ends of said third spring member, a fourth substantially straight spring member having one end joined to an end of said second spring member and being disposed beneath said second member forming a fourth juncture therebetween, said fourth spring member overlapping said third spring member and forming a fifth juncture therebetween, said fifth juncture being formed at a point on said third third spring member which is intermediate said third juncture and an end of said third spring member, said fifth juncture also being formed on said fourth spring member at a point which is intermediate the ends of said fourth member, a fifth substantially straight spring member having one end joined to and beneath an end of said third spring member so as to form a sixth juncture therebetween, said fifth spring member overlapping said fourth spring member and forming a seventh juncture therebetween, said seventh juncture being formed at a point on said fourth spring member which is intermediate said fifth juncture and an end of said fourth spring member, said seventh juncture being formed at a point on said fifth spring member which is intermediate the ends of said fifth spring member, a sixth spring member having one end joined to and beneath an end of said fourth spring member forming an eighth juncture therebetween, said sixth spring member overlapping said fifth spring member and forming a ninth juncture therebetween, said ninth juncture being formed at a point on said fifth spring member which is intermediate said seventh juncture and an end of said fifth spring member, and said ninth juncture being formed on said sixth spring member at a point which is intermediate the ends of said sixth spring member.

6. A spring assembly comprising a first substantially straight spring member, a second substantially straight spring member overlapping said first spring member and forming a first juncture therebetween, said first juncture being formed at a point on said first spring member which is spaced from one end of said first spring member a distance equal to approximately a third of the length of said first spring member, said first juncture also being formed at a point on said second spring member which is spaced from one end of said second spring member a distance equal to approximately a third of the length of said second spring member, a third substantially straight spring member having one end thereof joined to and beneath said one end of said first spring member forming a second juncture therebetween, said third spring member overlapping said second spring member and forming a third juncture therebetween, said third juncture being formed at a point on said second spring member which is substantially midway between said first juncture and the other end of said second spring member, said third juncture being formed at a point on said third spring member which is spaced from said one end of said third spring member a distance equal to approximately a third of the length of said third spring member, a fourth substantially straight spring member having one end joined to the other end of said second spring member and being disposed beneath said second member other end forming a fourth juncture therebetween, said fourth spring member overlapping said third spring member and forming a fifth juncture therebetween, said fifth juncture being formed at a point on said third spring member which is substantially midway between said third juncture and the other end of said third spring member, said fifth juncture also being formed on said fourth spring member at a point which is spaced from one end of said fourth member a distance which is equal to approximately a third of the length of said fourth spring member, a fifth substantially straight spring member having one end joined beneath the other end of said third spring member so as to form a sixth juncture therebetween, said fifth spring member overlapping said fourth spring member and forming a seventh juncture therebetween, said seventh juncture being formed at a point on said fourth spring member which is substantially midway between said fifth juncture and the other end of said fourth spring member, said seventh juncture being formed at a point on said fifth spring member which is spaced from said one end of said fifth spring member a distance equal to approximately a third of the length of said fifth spring member, a sixth spring member having one end joined to and beneath the other end of said fourth spring member forming an eighth juncture therebetween, said sixth spring member overlapping said fifth spring member and forming a ninth juncture therebetween, said ninth juncture being formed at the point on said fifth spring member which is substantially midway between said seventh juncture and the other end of said fifth spring member, and said ninth juncture being formed on said sixth spring member at a point which is spaced from said one end of said sixth spring member a distance equal to approximately a third of the length of said sixth spring member.

7. A spring assembly comprising a first plurality of first relatively elongated spring members being serially joined in overlapping end-to-end relationship, a second plurality of second relatively elongated spring members being serially joined in overlapping end-to-end relationship, said first plurality of first spring members collectively forming a first generally segmental spiral with each of said first spring members forming a segment of said first spiral, and said second plurality of second spring members collectively forming a second generally segmental spiral with each of said second spring members forming a segment of said second spiral, said first and second spirals being arranged with respect to each other so as to cause each of said first spring members to be intersected at a point intermediate with ends thereof and in overlapping fashion by at least one of said second spring members.

8. A spring assembly comprising a first plurality of first elongated spring beam members of substantially uniform cross-section being serially joined by welding in overlapping end-to-end relationship, a second plurality of second elongated spring beam members of substantially uniform cross-section being serially joined by welding in overlapping end-to-end relationship, said first plurality of first spring beam members collectively forming a first generally segmental spiral with each of said first beam members forming a segment of said first spiral, and said second plurality of second spring beam members collectively forming a second generally segmental spiral with each of said second beam members forming a segment of said second spiral, said first and second spirals being arranged with respect to each other so as to cause each of said first beam members to be intersected at a point intermediate the ends thereof and in overlapping fashion by at least one of said second beam members.

9. A spring assembly comprising a first plurality of first elongated spring beam members of substantially uniform cross-section being serially joined in overlapping end-to-end relationship, a second plurality of second elongated spring beam members of substantially uniform cross-section being serially joined in overlapping end-to-end relationship, said first plurality of first spring beam members collectively forming a first generally segmental spiral with each of said first beam members forming a segment of said first spiral, and said second plurality of second spring beam members collectively forming a second generally segmental spiral with each of said second beam members forming a segment of said second spiral, said first and second spirals being arranged with respect to each other so as to cause each of said first beam members to be intersected at a point intermediate the ends thereof and in overlapping fashion by at least one of said second beam members.

10. A spring assembly comprising a first plurality of first elongated spring beam members of substantially uniform cross-section being serially joined by welding in overlapping end-to-end relationship, a second plurality of second elongated spring beam members of substantially uniform cross-section being serially joined by welding in overlapping end-to-end relationship, said first plurality of first spring beam members collectively forming a first generally segmental spiral with each of said first beam members forming a segment of said first spiral, and said second plurality of second spring beam members collectively forming a second generally segmental spiral with each of said second beam members forming a segment of said second spiral, said first and second spirals being arranged with respect to each other so as to cause each of said first beam members to be intersected at a point intermediate the ends thereof and in overlapping fashion by at least one of said second beam members, each of said points of intersection intermediate the ends of said first beam members being formed as welded junctures.

11. A spring assembly comprising a first plurality of first relatively elongated spring members being serially joined in overlapping end-to-end relationship, a second plurality of second relatively elongated spring members being serially joined in overlapping end-to-end relationship, said first plurality of first spring members collectively forming a first generally segmental spiral with each of said first spring members forming a segment of said first spiral, and said second plurality of second spring members collectively forming a second generally segmental spiral with each of said second spring members forming a segment of said second spiral, said first and second spirals being arranged with respect to each other so as to cause each of said first spring members to be intersected at a point intermediate the ends thereof and in overlapping fashion by at least one of said second spring members, and mechanical means for joining cooperating first spring members to said second spring members in a manner permitting relative motion between said cooperating members.

12. A spring assembly comprising a first plurality of first relatively elongated spring members being serially joined in overlapping end-to-end relationship, a second plurality of second relatively elongated spring members being serially joined in overlapping end-to-end relationship, said first plurality of first spring members collectively forming a first generally segmental spiral with each of said first spring members forming a segment of said first spiral, and said second plurality of second spring members collectively forming a second generally segmental spiral with each of said second spring members forming a segment of said second spiral, said first and second spirals being arranged with respect to each other so as to cause each of said first spring members to be intersected at a point intermediate the ends thereof and in overlapping fashion by at least one of said second spring members, and mechanical means for joining cooperating first spring members to said second spring members in a manner permitting relative motion between said cooperating members, said mechanical means comprising a journal device having first and second bearing surfaces formed therethrough which are skew to each other and which respectively slidably receive first and second spring members therethrough.

13. A spring assembly comprising a first elongated spring member, a second elongated spring member overlapping said first spring member and forming a first juncture therebetween, said first juncture being formed at a point on said first spring member which is spaced from one end of said first spring member a distance equal to approximately a third of the length of said first spring member, said first juncture also being formed at a point on said second spring member which is spaced from one end of said second spring member a distance equal to approximately a third of the length of said second spring member, a third elongated spring member having one end thereof joined to and above said one end of said first spring member forming a second juncture therebetween, said second spring member overlapping said third spring member and forming a third juncture therebetween, said third juncture being formed at a point on said second spring member which is substantially midway between said first juncture and the other end of said second spring member, said third juncture being formed at a point on said third spring member which is spaced from said one end of said third spring member a distance equal to approximately a third of the length of said third spring member, a fourth elongated spring member having one end joined to the other end of said second spring member and being disposed above said second member other end and forming a fourth juncture therebetween, said third spring member overlapping said fourth spring member and forming a fifth juncture therebetween, said fifth juncture being formed at a point on said third spring member which is substantially midway between said third juncture and the other end of said third spring member, said fifth juncture also being formed on said fourth spring member at a point which is spaced from one end of said fourth member a distance which is equal to approximately a third of the length of said fourth spring member, a fifth elongated spring member having one end joined to and above the other end of said third spring member so as to form a sixth juncture therebetween, said fourth spring member overlapping said fifth spring member and forming a seventh juncture therebetween, said seventh juncture being formed at a point on said fourth spring member which is substantially midway between said fifth juncture and the other end of said fourth spring member, said seventh juncture being formed at a point on said fifth spring member which is spaced from said one end of said fifth spring member a distance equal to approximately a third of the length of said fifth spring member, a sixth spring member having one end joined to and above the other end of said fourth spring member forming an eighth juncture therebetween, said fifth spring member overlapping said sixth spring member and forming a ninth juncture therebetween, said ninth juncture being formed at the point on said fifth spring member which is substantially midway between said seventh juncture and the other end of said fifth spring member, and said ninth juncture being formed on said sixth spring member at a point which is spaced from said one end of said sixth spring member a distance equal to approximately a third of the length of said sixth spring member.

14. A spring assembly comprising a first generally S-shaped spring member, a second generally S-shaped spring member overlapping said first spring member and forming a first juncture therebetween, said first juncture being formed at a point on said first spring member which is spaced from one end of said first spring member a distance equal to approximately a third of the length of said first spring member, said first juncture also being formed at a point on said second spring member which is spaced from one end of said second spring member a distance equal to approximately a third of the length of said second spring member, a third generally S-shaped spring member having one end thereof joined to and above said one end of said first spring member forming a second juncture therebetween, said second spring member overlapping said third spring member and forming a third juncture therebetween, said third juncture being formed at a point on said second spring member which is substantially midway between said first juncture and the other end of said second spring member, said third juncture being formed at a point on said third spring member which is spaced from said one end of said third spring member a distance equal to approximately a third of the length of said third spring member, a fourth generally S-shaped spring member having one end joined to the other end of said second spring member and being disposed above said second member other end and forming a fourth juncture therebetween, said third spring member overlapping said fourth spring member and forming a fifth juncture therebetween, said fifth juncture being formed at a point on said third spring member which is substantially midway between said third juncture and the other end of said third spring member, said fifth juncture also being formed on said fourth spring member at a point which is spaced from one end of said fourth member a distance which is equal to approximately a third of the length of said fourth spring member, a fifth generally S-shaped spring member having one end joined to and above the other end of said third spring member so as to form a sixth juncture therebetween, said fourth spring member overlapping said fifth spring member and forming a seventh juncture therebetween, said seventh juncture being formed at a point on said fourth spring member which is substantially midway between said fifth juncture and the other end of said fourth spring member, said seventh juncture being formed at a point on said fifth spring member which is spaced from said one end of said fifth spring member a distance equal to approximately a third of the length of said fifth spring member, a sixth generally S-shaped spring member having one end joined to and above the other end of said fourth spring member forming an eighth juncture between, said fifth spring member overlapping said sixth spring member and forming a ninth juncture therebetween, said ninth juncture being formed at the point on said fifth spring member which is substantially midway between said seventh juncture and the other end of said fifth spring member, and said ninth juncture being formed on said sixth spring member at a point which is spaced from said one end of said sixth spring member a distance equal to approximately a third of the length of said sixth spring member.

15. A spring assembly comprising a first plurality of first generally S-shaped spring members being serially joined in overlapping end-to-end relationship, a second plurality of second generally S-shaped spring members being serially joined in overlapping end-to-end relationship, said first plurality of first spring members collectively forming a first negative pitch segmental spiral with each of said first spring members forming a segment of said first spiral, and said second plurality of second generally S-shaped spring members collectively forming a second negative pitch segmental spiral with each of said second spring members forming a segment of said second spiral, said first and second spirals being arranged with respect to each other so as to cause each of said first spring members to be intersected at a point intermediate the ends thereof and in overlapping fashion by at least one of said second spring members.

16. A spring assembly comprising a first plurality of first spring members being serially joined in overlapping end-to-end relationship, a second plurality of second spring members being serially joined in overlapping end-to-end relationship, said first plurality of first spring members collectively forming a first generally segmental spiral with each of said first spring members forming a segment of said first spiral, and said second plurality of second spring members collectively forming a second generally segmental spiral with each of said second spring members forming a segment of said second spiral, said first and second spirals being arranged with respect to each other so as to cause each of said first spring members to be intersected at a point intermediate the ends thereof and in overlapping fashion by at least one of said second spring members.

17. A spring assembly comprising a first plurality of first spring members being serially joined in overlapping end-to-end relationship, a second plurality of second spring members being serially joined in overlapping end-to-end relationship, said first plurality of first spring members collectively forming a first generally segmental spiral with each of said first spring members forming a segment of said first spiral, and said second plurality of second spring members collectively forming a second generally segmental spiral with each of said second spring members forming a segment of said second spiral, said first and second spirals being arranged with respect to each other so as to cause each of said first spring members to be intersected at a point intermediate the ends thereof and in overlapping fashion by at least one of said second spring members, and means operatively connected to the terminal ends of said spring assembly for the application thereto of forces reacting against said spring assembly.

References Cited by the Examiner

UNITED STATES PATENTS

| | | | |
|---|---|---|---|
| 2,458,118 | 1/1949 | Tursky | 267—1 |
| 2,607,582 | 8/1952 | Jurgens | 267—1 |

FOREIGN PATENTS

| | | |
|---|---|---|
| 503,441 | 6/1951 | Belgium. |
| 926,157 | 4/1947 | France. |

ARTHUR L. LA POINT, *Primary Examiner.*

R. M. WOHLFARTH, *Assistant Examiner.*